United States Patent [19]
Gotoh et al.

[11] Patent Number: 5,451,820
[45] Date of Patent: Sep. 19, 1995

[54] AUTOMATIC STARTING AND STOPPING APPARATUS FOR AN ENGINE

[75] Inventors: Takeo Gotoh, deceased, late of Shikama, by Mie Gotoh, heir; Satoshi Moribayashi, Himeji; Keiichi Konishi, Himeji; Kyohei Yamamoto, Himeji, all of Japan

[73] Assignee: Mitsubishi Denki Kabushiki Kaisha, Tokyo, Japan

[21] Appl. No.: 260,227

[22] Filed: Jun. 14, 1994

[30] Foreign Application Priority Data

Jun. 16, 1993 [JP] Japan .................. 5-145091

[51] Int. Cl.$^6$ .................. F02N 17/08; G08G 1/09
[52] U.S. Cl. .................. 307/10.6; 123/179.4; 123/198 DC; 290/38 C; 340/435; 340/439; 340/905
[58] Field of Search .................. 307/9.1, 10.1, 10.6, 307/10.3; 290/38 C, 38 D, 38 E; 123/179.3, 179.4, 198 DC, 198 DB; 180/282–284; 348/148, 149; 364/424.03; 340/825.69, 825.72, 903, 905, 435, 436, 439

[56] References Cited
U.S. PATENT DOCUMENTS

| | | | |
|---|---|---|---|
| 4,192,279 | 3/1980 | Maisch et al. | 123/198 DC |
| 4,286,683 | 9/1981 | Zeigner et al. | 290/38 E |
| 4,312,310 | 1/1982 | Chiviló et al. | 123/198 DB |
| 4,402,286 | 9/1983 | Pagel et al. | 123/179.3 |
| 4,500,794 | 2/1985 | Hamano et al. | 290/38 C |
| 4,630,577 | 12/1986 | Cornacchia | 123/198 DB |
| 4,833,469 | 5/1989 | David | 340/903 |
| 4,878,050 | 10/1989 | Kelley | 307/10.6 |
| 5,357,438 | 10/1994 | Davidian | 340/436 |

FOREIGN PATENT DOCUMENTS 50-9636 1/1975 Japan .
59-76424 5/1984 Japan .

*Primary Examiner*—William M. Shoop, Jr.
*Assistant Examiner*—Richard T. Elms
*Attorney, Agent, or Firm*—Sughrue, Mion, Zinn, Macpeak and Seas

[57] ABSTRACT

The present invention relates to an automatic starting and stopping apparatus for an engine, which prolongs the lives of mechanical components such as a starter motor and which is applicable also to automatic vehicles. The automatic starting and stopping apparatus for an engine comprises a vehicle-to-vehicle distance sensor 29, which detects whether the distance from the preceding vehicle is less than a preset value, a signal color identifying and detecting device 30, which identifies whether the lit color of the signal is yellow or red, a car speed sensor 15, and a control circuit 31, which performs automatic start and stop of the engine in accordance with the detection results of the vehicle-to-vehicle distance sensor 29 and the signal color identifying and detecting apparatus 30. The control circuit 31 carries out automatic stop by cutting off the electric power to the engine ignition circuit 3 if the vehicle-to-vehicle distance is less than the preset value or the signal indicates a yellow or red light and also the car speed is zero, while it supplies electric currents to the starter 8 and the engine ignition circuit to implement automatic start when the vehicle-to-vehicle distance has reached the preset value or more or the lit signal color has changed from red to green.

7 Claims, 7 Drawing Sheets

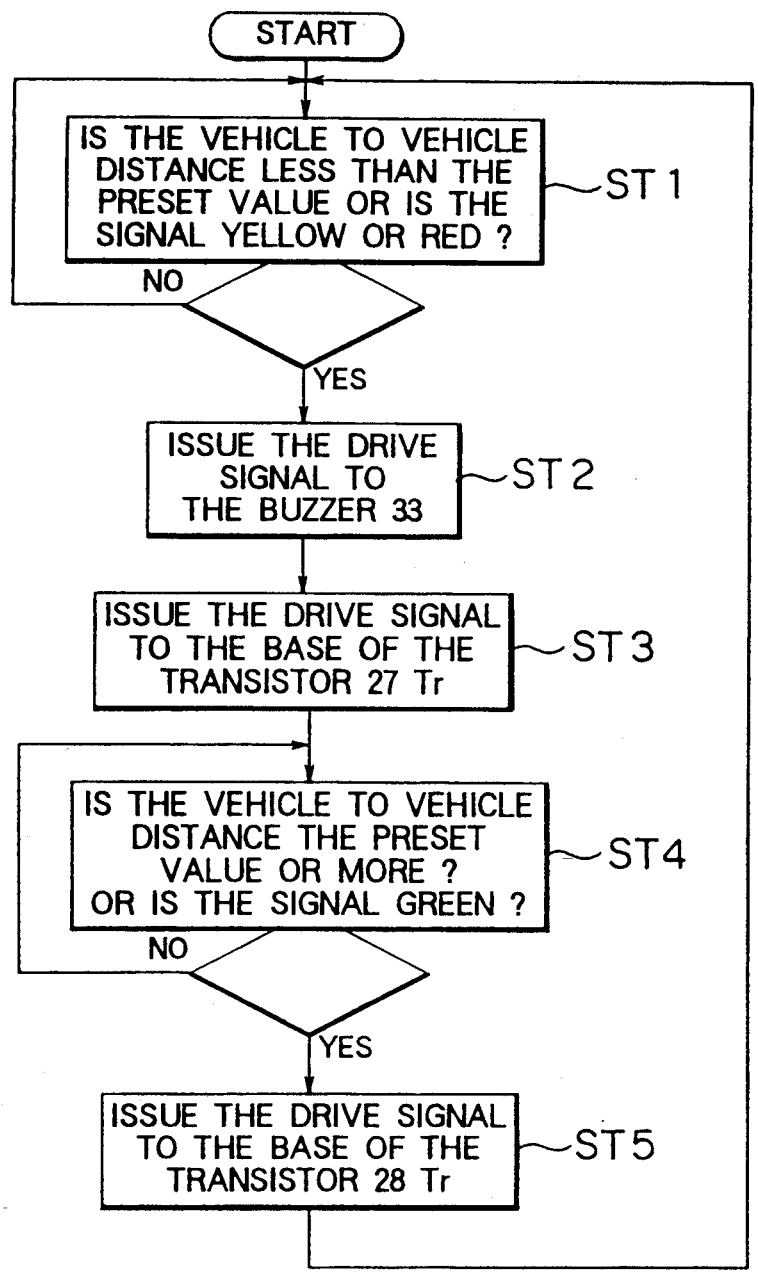

AUTOMATIC STARTING AND STOPPING APPARATUS FOR AN ENGINE

BACKGROUND OF THE INVENTION

1. Field of the Invention

The present invention relates to an automatic starting and stopping apparatus for an engine, which automatically stops an engine in such a case where an automobile stops at a crossing to wait for the traffic lights to change, thereby cutting down the travel fuel consumption and, more particularly, to an automatic starting and stopping apparatus for an engine, which prolongs the life of a starter motor and other mechanical components by carrying out a minimum of proper automatic stop, and which is applicable to a wider variety of car models.

2. Description of the Related Art

FIG. 7 is a circuit diagram which shows a conventional automatic starting and stopping apparatus for an engine described, for example, in Japanese Utility Model Publication No. 63-2,588. In the drawing, a battery 1 is mounted on a vehicle to serve as a power source therefor, a key switch 2 connects a terminal 2B of the battery 1 to an ignition terminal 2A and a starter terminal 2C to supply line voltage, an engine ignition circuit 3 has an ignition coil 3L, and numeral 4 denotes a normally-open starting switch.

The circuit shown in FIG. 7 includes a self-holding relay coil 5 and a self-holding contact 6; when the coil 5 is supplied with electric currents and energized, the electrical connection between terminals 6a and 6b is changed over to the electrical connection between the terminal 6a and a terminal 6c. Further, the voltage of the ignition terminal 2A is applied to the coil 5 via the self-holding contact 6, which has been electrically connected to the terminal 6c, and a normally-close canceling switch 7, the contact 6 being self-held by the coil 5.

Numeral 8 denotes a starter, which is connected to the starter terminal 2C to start the engine. An ignition electric current supply control circuit 9 is supplied with electric power by the self-holding of the contact 6 and it controls the supply of electric power to the ignition circuit 3 via a relay 9L. A starter electric current supply control circuit 10 controls the supply of electric power to the starter 8 via a relay 10L, which is energized when supplied with electric currents via the self-held contact 6.

A lighting switch 11 is closed in response to the lighting of the headlights; it applies the positive potential applied to a terminal 11a to the ignition electric current supply control circuit 9. A reverse switch 12 is closed when the vehicle moves back; it applies the positive potential applied to a terminal 12a to the ignition electric current supply control circuit 9. A water temperature sensor 13 is represented by a normally-close switch; it is released at such a high temperature that causes the temperature of the engine cooling water to overheat, thereby cutting off the grounded state of the power input of the ignition electric current supply control circuit 9. A turn signal switch 14 is closed when the vehicle turns right; it applies the positive potential applied to a terminal 14a to the ignition electric current supply control circuit 9.

A car speed sensor 15 generates a travel signal corresponding to the car speed; it intermittently issues the travel signal through a permanent magnet (not shown), which is fixed on an axle and rotates while the vehicle is traveling. An accelerator switch 16 closes when an accelerator pedal is depressed and it places the power input of the starter electric current supply control circuit 10 in the grounded state. A slope switch 18 closes when it detects the inclination of a slope; it places the power input of the ignition electric current supply control circuit 9 in the grounded state when the vehicle starts climbing the slope.

A clutch switch 19 closes to place the power input of the starter electric current supply control circuit 10 in the grounded state and issues a disengagement detection signal when a clutch pedal is fully depressed to completely disengage the clutch. An engine start detection circuit 20 detects the voltage of an alternator 20a generated due to the revolution of the engine, whereby to indirectly detect the start of the engine, and it places the starter electric current supply control circuit 10 in a shutoff state to cut off the supply of electric power to the starter 8.

A normally-close brake switch 23 is released when a brake pedal is depressed. Neutral switches 24, 25 are interlocked with a shift lever 26 of a transmission; they are released when the shift lever 26 is set in the neutral position.

Diodes $9D_1$ through $9D_6$, resistors $9R_1$ through $9R_6$, capacitors $9C_1$ and $9C_2$, and transistors $9Tr_1$ through $9Tr_4$ constitute the ignition electric current supply control circuit 9. A diode 10D, a resistor 10R, and transistors $10Tr_1$ and $10Tr_2$ constitute the starter electric current supply control circuit 10. Transistors $20Tr_1$ and $20Tr_2$ constitute the engine start detection circuit 20.

FIG. 8 is an explanatory drawing which shows the operation of a manually-operated automotive clutch, 21 being a driver's foot, 22 being a clutch pedal, and 22a and 22b indicating the positions of the clutch pedal 22. The clutch switch 19 is arranged so that it closes when the clutch pedal 22 is fully depressed to the position 22b.

The operation of the conventional automatic starting and stopping apparatus for an engine will now be described with reference to FIG. 7. First, turning the key switch 2 ON to close the starting switch 4 causes the electric power of the battery 1 to be applied to the coil 5 via the key switch 2 and the starting switch 4. The coil 5, which has been supplied with electric currents, electrically connects the terminals 6a and 6c of the contact 6. As a result, even when the starting switch 4 is released, the contact 6 is self-held because exciting currents flow through the coil 5 via the contact 6 and the canceling switch 7. Hence, the line voltage from the battery 1 is applied to the ignition electric current supply control circuit 9, the starter electric current supply control circuit 10, and the engine start detection circuit 20 via the contact 6.

When the engine is started and the vehicle starts travelling, the car speed sensor 15 turns ON and OFF. This ON/OFF operation causes the electric charges to be charged in the capacitor $9C_1$ through the resistor $9R_3$ then they are charged in the capacitor $9C_2$ through the diode $9D_3$, thus generating positive voltage. This positive voltage turns the transistor $9Tr_2$ ON and the potential of the collector thereof becomes the ground potential, which is applied to the base of the subsequent transistor $9Tr_3$, turning the transistor $9Tr_3$ OFF, with the positive-potential applied to the base of the subsequent output transistor $9Tr_4$, thus turning it ON.

When the output transistor $9Tr_4$ is turned ON, the coil of the ignition electric current supply relay 9L connected to the collector is supplied with electric power and the contact of the ignition electric current supply relay 9L closes. Through this closed contact, the currents are supplied from the battery 1 to an ignition coil 3L of the ignition circuit 3, and the engine continues to run.

After that, when the vehicle stops, the car speed sensor 15 stops issuing the travel signal. At this time, the driver is depressing the brake pedal and the brake switch 23 is released. Further, when the neutral switches 24 and 25 are released, and the accelerator switch 16 and the slope switch 18 are open, with the shift lever 26 of the transmission set in the neutral position, the positive potential is continuously applied to the base of the transistor $9Tr_1$ via the resistor $9R_2$, causing the transistor to turn ON and the collector of the transistor $9Tr_1$ to provide the ground potential, thereby preventing the capacitor $9C_2$ from being charged.

Moreover, when the turn signal switch 14 is open, the charging of tile capacitor $9C_2$ with the positive potential applied to the terminal 14a is not carried out; therefore, the potential of the capacitor $9C_2$ becomes 0 V. This turns the transistor $9Tr_2$ OFF and turns the transistor $9Tr_3$ ON. With the transistor $9Tr_3$ turned ON, if the lighting switch 11 and the reverse switch 12 are open and the water temperature sensor 13 is closed, then the output transistor $9Tr_4$ turns OFF, causing the contact of the ignition electric current supply relay 9L to be released and the electric power supplied to the engine ignition circuit 3 to be cut off, thus stopping the engine.

On the other hand, at the time of automatic start, fully depressing the clutch pedal 22 to the position 22b (FIG. 8) and setting the shift lever 26 of the transmission in a position other than the neutral cause the clutch switch 19 and the neutral switches 24 and 25 to be closed. When the neutral switch 25 is closed, the transistor $9Tr_1$ turns OFF because the potential of the base thereof becomes the ground potential.

Thus, the charging currents flow into the capacitor $9C_2$ via the resistor $9R_3$ and the diodes $9D_4$ and $9D_6$ to provide a predetermined charging voltage; therefore, the transistor $9Tr_2$ turns ON, the transistor $9Tr_3$ turns OFF, and the transistor $9Tr_4$ turns ON, causing the currents to flow into the coil of the ignition electric current supply relay 9L. In addition, the contact of the ignition electric current supply relay 9L closes, thus supplying electric currents to the ignition coil 3L of the ignition circuit 3.

Further, when the neutral switch 24 and the clutch switch 19 are closed, the anode of the diode 10D is grounded, thus bypassing the base currents, which flow through the transistor $10Tr_1$ via the diode 10D, to the earth via the resistor 10R, the clutch switch 19, and the neutral switch 24.

Accordingly, the voltage reduced through the resistor 10R is applied to the base of the transistor $20Tr_2$ of the engine start detection circuit 20, turning the transistor ON; when the transistor $10Tr_1$ turns OFF and the output transistor $10Tr_2$ turns ON, the starter electric current supply relay 10L is closed to energize the starter 8, thereby automatically starting the engine. After the engine is automatically started, the engine start detection circuit 20 applies the output of the alternator 20a to the base of the transistor $20Tr_1$ through the filter to turn the transmission ON and turn the following transistor $20Tr_2$ OFF.

As a result, the potential of the collector of the transistor $20Tr_2$ turns to a positive potential which is applied to the base of the transistor $10Tr_1$ of the starter electric current supply control circuit 10 to turn the transistor $10Tr_1$ ON and turn the output transistor $10Tr_2$ OFF, thereby stopping the supply of power to the starter 8.

The operations described above can be summarized as shown in Table 1 below:

TABLE 1

| [Engine] | [T/M] | [Clutch] | [Brake] | [Car Speed] |
| --- | --- | --- | --- | --- |
| Stop | N | — | SW23 OFF | 0 (Stop) |
| Start | Other than N | SW19 ON | — | 0 (Stop) | where T/M denotes the transmission and N stands for neutral in Table 1. The car speed is detected by the car speed sensor 15 and it is zero in both automatic stop and automatic start. In addition, as previously described, more conditions, wherein the slope switch 18, the turn signal switch 14, the accelerator switch 16, the lighting switch 11, and the reverse switch 12 are open, and water temperature sensor 13 is closed, are added in the case of the automatic stop. The opposite from these conditions provides the conditions for maintaining the operation.

Thus, the automatic stop of the engine is performed on condition that the brake pedal is depressed at the zero car speed and also the transmission is in the neutral position; therefore, the engine can be stopped even if the brake is engaged to stop the vehicle with the shift lever 26 of the transmission shifted to the neutral position, and the clutch pedal 22 not being depressed, at the time of stopping the vehicle.

Likewise, at the time of starting the vehicle, the automatic start is performed when the clutch switch 19 is fully depressed and also the shift lever 26 of the transmission is set in a position other than the neutral. This enables the confirmation of the driver's intention by the shift position of the transmission and it also prevents the starter 8 from being started and energized with the clutch engaged incompletely, thus leading to higher reliability.

The conventional automatic starting and stopping apparatus for an engine presented a problem of a shortened lives of mechanical components, including the starter motor 8 for starting the engine, because vehicles must stop at pedestrian crossings, railroad crossings or before merging into main streets from side streets in urban districts or the like in addition to stopping due to traffic jams, wherein the distances between vehicles become shorter, or due to waiting for the traffic lights to change; thus the engine is stopped frequently, making the stop and start of the engine complicated as a whole.

The use of the clutch pedal 22 as the switch for stopping the engine presented another problem in that the conventional apparatus could not be applied to automatic vehicles, restricting the applicable car models.

SUMMARY OF THE INVENTION

The present invention intends to solve the problems described above, and it is an object of the present invention to provide an automatic starting and stopping apparatus for an engine, which apparatus is designed to stop and start the engine only during traffic jams and when stopping to wait for the traffic lights to change, thereby to prolong the lives of the mechanical components such as the starter motor for starting the engine, and also to expand the range of the applicable types of cars by making the apparatus applicable also to automatic vehicles.

In view of the objects described above, the first aspect of the present invention provides an automatic starting and stopping apparatus for an engine, the apparatus comprising a starter for actuating an engine, an engine ignition circuit for actuating the engine, a condition detecting means, which detects the operation maintaining condition of the engine, a car speed sensor, which generates a travel signal corresponding to the speed of the vehicle, a vehicle-to-vehicle distance sensor, which detects the distance between the vehicle and the preceding vehicle and determines whether the vehicle-to-vehicle distance is less than a preset value, and a controlling means, which carries out automatic stop and automatic start of the engine in accordance with the detection results of the condition detecting means, the car speed sensor, and the vehicle-to-vehicle distance sensor, the controlling means shutting off the electric power to the engine ignition circuit to automatically stop the engine if the vehicle-to-vehicle distance is less than the preset value, the travel signal indicates the zero car speed, and no detection signal is received from the condition detecting means, while supplying electric currents to the starter and the engine ignition circuit to automatically start the engine if the vehicle-to-vehicle distance is the preset value or more.

The second aspect of the present invention is to provide an automatic stopping and starting apparatus for an engine, which apparatus comprising a starter for starting the engine, an engine ignition circuit for actuating the engine, a condition detecting means, which detects the operation maintaining condition of the engine, a car speed sensor, which generates a travel signal corresponding to the speed of the vehicle, a signal color identifying and detecting device, which detects the lit color of a signal located in front of the vehicle and identifies whether it is yellow or red, and a controlling means, which carries out automatic stop and automatic start of the engine in accordance with the detection results of the condition detecting means, the car speed sensor, and the signal color identifying and detecting device, the controlling means shutting off the electric power to the engine ignition circuit to automatically stop the engine if the lit color of the signal is yellow or red, the travel signal indicates the zero car speed, and no detection signal is received from the condition detecting means, while supplying electric currents to the starter and the engine ignition circuit to automatically start the engine when the lit color of the signal has changed from red to green.

The third aspect of the present invention is to provide an automatic starting and stopping apparatus for an engine, the apparatus comprising a starter for starting an engine, an engine ignition circuit for actuating the engine, a condition detecting means, which detects the operation maintaining condition of the engine, a car speed sensor, which generates a travel signal corresponding to the speed of the vehicle, a vehicle-to-vehicle distance sensor, which detects the distance between the vehicle and the preceding vehicle and determines whether the vehicle-to-vehicle distance is less than a preset value, a signal color identifying and detecting device, which detects the lit color of a signal located in front of the vehicle and identifies whether it is yellow or red, and a controlling means, which carries out automatic stop and automatic start of the engine in accordance with the detection results of the condition detecting means, the car speed sensor, the vehicle-to-vehicle distance sensor, and the signal color identifying and detecting device, the controlling means shutting off the electric power to the engine ignition circuit to automatically stop the engine if at least the vehicle-to-vehicle distance is less than the preset value or the lit color of the signal is yellow or red, the travel signal indicates the zero car speed, and no detection signal is received from the condition detecting means, while supplying electric currents to the starter and the engine ignition circuit to automatically start the engine when the vehicle-to-vehicle distance is the preset value or more or when the lit color of the signal has changed from red to green.

In the second and third aspects of the present invention, the signal color identifying and detecting device primarily comprises, for example, a photographing means designed to photograph a scope, which is nearly equivalent to the front view of the driver of the vehicle, a signal color identifier, which identifies the lit color of the signal from an image produced by the photographing means, or a signal color identifier, which identifies the lit color of the signal through a receiver, which receives the signal information transmitted from a ground station, and from the signal information.

BRIEF DESCRIPTION OF THE DRAWINGS

FIG. 5 is a flowchart for explaining the operation of Embodiment 4;

DESCRIPTION OF THE PREFERRED EMBODIMENTS

The following describes the embodiments of the present invention.

Embodiment 1

Figure 1:
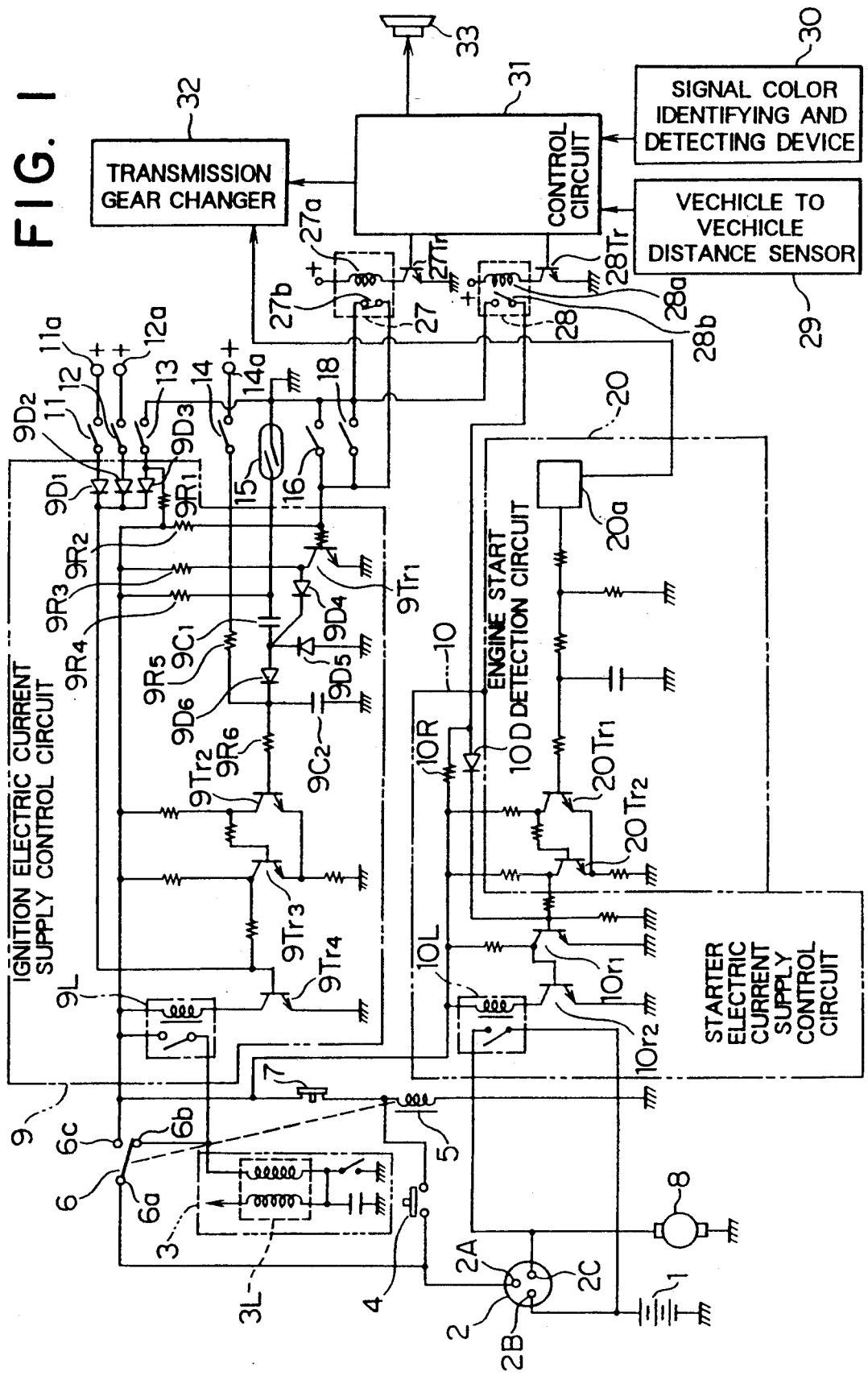
FIG. 1 is a circuit diagram for explaining Embodiment 1 and Embodiment 2 of the present invention.
Figure 8:
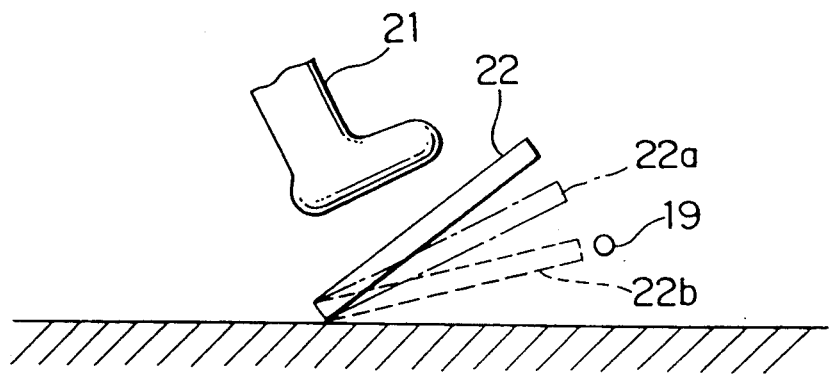
FIG. 8 is an explanatory drawing, which shows the operation of the clutch pedal in the conventional automatic starting and stopping apparatus for an engine.
Figure 7:
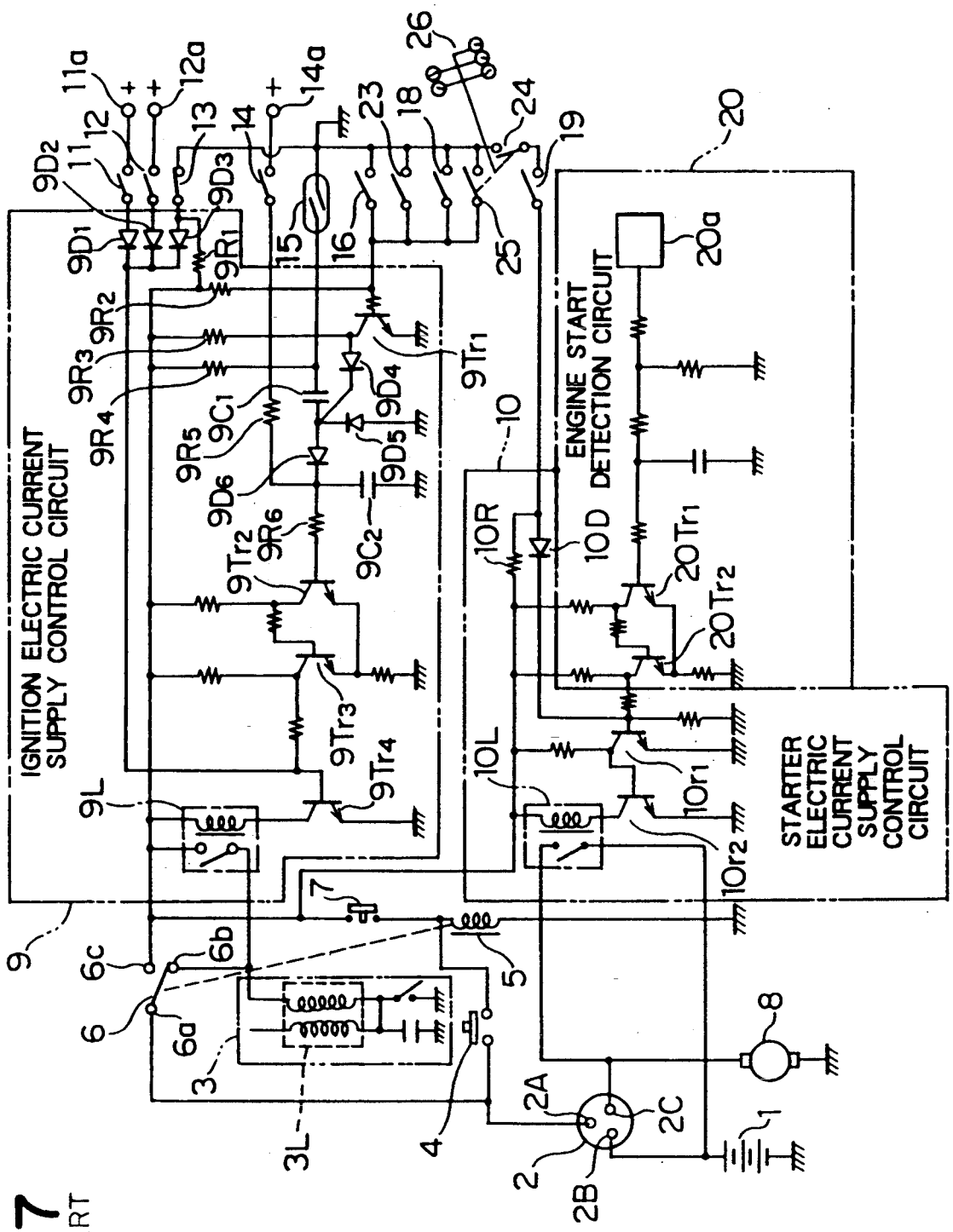
FIG. 7 is a circuit diagram, which shows the conventional automatic starting and stopping apparatus for an engine.

Embodiment 1 of the present invention will be explained, referring to the attached drawings. FIG. 1 is the circuit block diagram, which shows Embodiment 1 of the present invention. In the drawing, the reference numerals 1 through 16, 18, and 20 are the same as those previously mentioned in FIG. 8. In this embodiment, however, the installation of the apparatus is limited to that for automatic cars; therefore, the clutch switch 19, the brake switch 23, the neutral switches 24, 25, and the shift lever 26 shown in FIG. 8 are not provided.

The lighting switch 11, the reverse switch 12, the water temperature sensor 13, and the accelerator switch 16, etc. together with a power generation sensor or the like, which is not shown, constitute the condition detecting means, which is designed to detect the operation maintaining condition of the engine and generates a detection signal indicating the need for maintaining the operation of the engine.

In the drawing, a transistor 27Tr is turned ON by an automatic stop signal issued from a control circuit 31 serving as a controlling means to be discussed later, a coil 27a of an automatic stop relay 27 being connected to the collector of the transistor 27Tr, and the normally-close contact 27b of the automatic stopping relay 27 being connected across a slope switch 18. When the normally-close contact 27b is opened, the electric power supplied to the engine ignition circuit 3 is cut off to automatically stop the engine.

A transistor 28Tr is turned ON by an automatic start signal issued from the control circuit 31, a coil 28a of an automatic starting relay 28 being connected to the collector of the transistor 28Tr, and a normally-open contact 28b of the automatic starting relay 28 being inserted between one end of the slope switch 18 and the anode of the diode 10D constituting the starter electric current supply control circuit 10 in place of the clutch switch 19 and the neutral switches 24, 25 of the conventional apparatus. When the normally-open contact 28b is closed, the engine ignition circuit 3 and the starter 8 are supplied with electric currents to automatically start the engine.

Numeral 29 denotes, for example, an ultrasonic vehicle-to-vehicle distance sensor, which detects the distance between the vehicle and the preceding vehicle. The vehicle-to-vehicle distance sensor 29 detects whether the vehicle-to-vehicle distance calculated from the time required for the ultrasonic wave, which is emitted to the preceding vehicle, to return to the vehicle as a reflected wave, is smaller than or larger than a preset value (the vehicle-to-vehicle distance requiring the automatic stop).

Figure 6B:
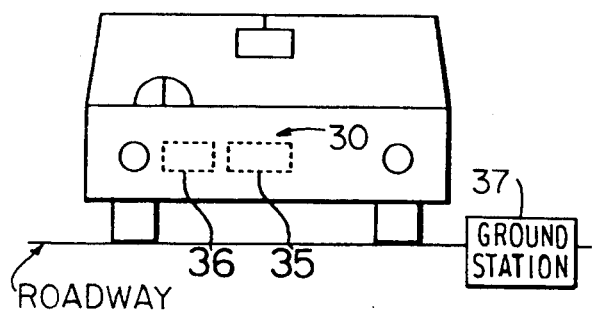
FIG. 6B is a front view, which shows the position of a receiver of the signal color identifying and detecting device in Embodiment 3 of the present invention.
Figure 6A:
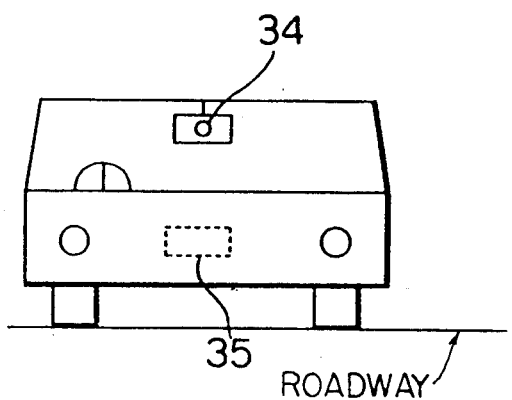
FIG. 6A is a front view, which shows the position of a camera of the signal color identifying and detecting device in Embodiment 1 and Embodiment 2 of the present invention.

An ultrasonic input/output section 35 of the vehicle-to-vehicle distance sensor 29 shown in FIG. 6A should be installed in the vicinity of the center of a front bumper so that the ultrasonic wave may accurately hit the preceding vehicle.

Further, a photographing section 34 of a video camera constituting a signal color identifying and detecting device 30 is installed, for example, on the front side of a rear-view mirror as shown in FIG. 6A or installed on the inside surface of the windshield where the rear-view mirror is installed. A photographed image is sent to the signal color identifying and detecting device 30 comprised of the signal color identifier. Then, it is identified whether the lit color of the signal is yellow or red (the signal color requiring the automatic stop) and further identified whether it is green. A control circuit 31 is operated under the control of a microcomputer (not shown); the control circuit 31 turns ON the transistor 27Tr or the transistor 28Tr in accordance with the detection results of the vehicle-to-vehicle distance sensor 29 and the signal color identifying and detecting apparatus 30, thereby opening or closing the automatic stopping relay 27 or the automatic starting relay 28.

More specifically, the control circuit 31 releases the normally-close contact 27b when the vehicle-to-vehicle distance is found to be less than the preset value (or the lit color of the signal is yellow or red) in order to make the ignition electric current supply control circuit 9 inactive, thereby cutting off the electric power supplied to the engine ignition circuit 3 to automatically stop the engine. When the vehicle-to-vehicle distance reaches the preset value or more (or the lit color of the signal has changed from red to green), the control circuit closes the normally-open contact 28b to actuate the ignition electric current supply control circuit 9, thereby supplying electric currents to the engine ignition circuit 3 and also actuating the starter electric current supply control circuit 10 to drive the starter 8 for performing the automatic start of the engine.

A transmission gear changer 32 is driven under the control of the control circuit 31. The transmission gear changer 32 receives a signal issued by the control circuit 31 in synchronization with a signal issued to the transistor 28Tr at the beginning of the automatic start of the engine and temporarily shifts the transmission gear, not shown, to the neutral and further shifts the transmission gear from the neutral to a start state when it detects a power generation signal received from the alternator 20a after the engine is automatically started.

A buzzer 33 installed in a driver's seat cabin gives an audible alarm to notify the driver of danger in response to a drive signal received from the control circuit 31 when the vehicle-to-vehicle distance has reduced lower than the preset value or when the lit color of the signal is yellow or red.

Figure 2:
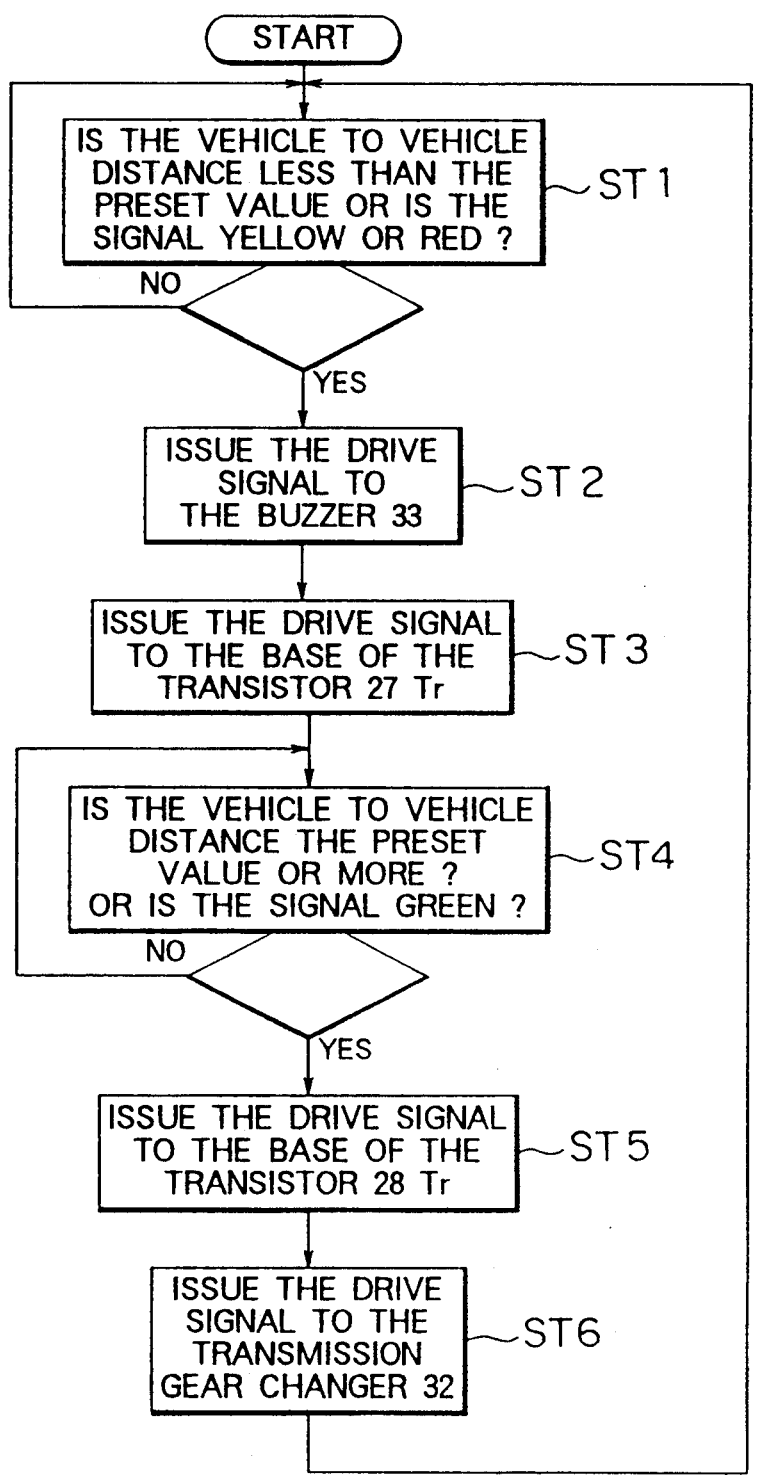
FIG. 2 is a flowchart for explaining the operations of Embodiment 1 and Embodiment 2.

The operation of Embodiment 1 of the present invention will now be described with reference to the flowchart of FIG. 2.

It is assumed that the vehicle-to-vehicle distance obtained through the vehicle-to-vehicle distance sensor 29 is less than the preset value or the signal color obtained through the signal color identifying and detecting apparatus 30 shows yellow or red, with the vehicle stopped, the travel signal from the car speed sensor 15 indicates the zero car speed, and no detection signal is received from the condition detecting means (a step ST1). In this case, the control circuit 31 determines that the engine should be automatically stopped and it outputs a drive signal to the buzzer 33 to issue an alarm to the driver (a step ST2). As a result, the control circuit 31 generates a drive signal and applies it to the base of the transistor 27Tr (a step ST3), and energizes the coil 27a of the automatic stopping relay 27 to open the normally-close contact 27b.

When the normally-close contact 27b is opened, with the water temperature sensor 13, the accelerator switch 16, and the slope switch 18 open, the base of the transistor 9Tr$_1$ is released from the grounded state, causing the positive potential to be applied to the base of the transistor 9Tr$_1$ via the resistor 9R$_2$ to turn the transistor ON, and the collector thereof to become the ground potential. As a result, the capacitor 9C$_2$ is not charged with electric charges via the resistor 9R$_3$ and diodes 9D$_4$, 9D$_6$, and further, it is not charged with electric charges via the resistor 9R$_5$ if the turn signal switch 14 is released; therefore, the potential of the capacitor 9C$_2$ becomes 0 V, causing the transistor 9Tr$_2$ to turn OFF and the transistor 9Tr$_3$ to turn ON.

Under this condition, if the lighting switch 11 and the reverse switch 12 are open and the positive potential applied to the terminals 11a, 12a is not applied to the base of the output transistor 9Tr$_4$, and if the water temperature sensor 13 is closed and the base of the transistor 9Tr$_4$ is in the grounded state, then the output transistor 9Tr$_4$ turns OFF and the ignition electric current supply relay 9L is released. Hence, the supply of electric power to the engine ignition circuit 3 is cut off and the engine stops automatically.

Thus, the automatic stop is performed only for a stop during a vehicle congestion or when stopping to wait for the traffic lights to change on condition that no engine operation condition is detected, the car speed is zero, and the vehicle-to-vehicle distance is less than the preset value or the lit color of the signal is yellow or red. This makes it possible to reduce the travel fuel consumed and also to prolong the life of the starter motor and other mechanical components.

On the other hand, when the automatic stop is shifted to the automatic start, the control circuit 31 checks for the conditions for the automatic start, i.e., it determines whether the distance from the preceding vehicle has exceeded the preset value, through the vehicle-to-vehicle distance sensor 29 or whether the lit color of the signal has changed from red to green through the signal color identifying and detecting device 30 (a step ST3). At this time, if the control circuit detects that the vehicle-to-vehicle distance is not the preset value or more, or the lit color of the signal has not changed from red to green, then it maintains the stop state and checks for the automatic start conditions again.

When the automatic start condition is detected in a step ST4, the application of the base drive signal given by the control circuit 31 is shifted from the base of the transistor 27Tr to the base of the transistor 28Tr. As a result, the transistor 27Tr turns OFF, setting the normally-close contact 27b back in the closed state. The turning ON of the transistor 28Tr energizes the coil 28a of the automatic starting relay 28, causing the normally-open contact 28b to be closed. Moreover, the control circuit 31 supplies a control signal to the transmission gear changer 32 in synchronization with the drive signal for the transistor 28Tr to shift the transmission gear to the neutral.

When the normally-close contact 27b is closed, the base potential of the transistor $9Tr_1$ becomes 0 V and the transistor $9Tr_1$ turns OFF. This causes the capacitor $9C_2$ to be charged with electric charges via the resistor $9R_3$, and the diodes $9D_4$ and $9D_6$, turning the transistor $9Tr_2$ ON. Further, when the transistor $9Tr_2$ turns ON, the transistor $9Tr_3$ turns OFF, causing the transistor $9Tr_4$ to turn ON. Hence, exciting currents flow into the ignition electric current supply relay 9L through the transistor $9Tr_4$, and the normally-open switch is closed to supply electric currents to the engine ignition circuit 3.

Further, the closing of the normally-open contact 28b of the automatic starting relay 28 causes the anode of the diode 10D to be grounded via the normally-open contact 28b. Accordingly, the currents flowing into the base of the transistor $10Tr_1$ via the resistor 10R and the diode 10D are bypassed to the ground via the normally-open contact 28b.

Hence, the voltage reduced through the resistor 10R is applied to the base of the transistor $20Tr_2$, turning the transistor ON, turning the following transistor $10Tr_1$ OFF, and further turning the transistor $10Tr_2$ ON, causing the exciting currents to flow into the starter electric current supply relay 10L to close the normally-close switch. This supplies electric currents to the starter 8 and the engine is started automatically.

When electric power is generated in the alternator 20a by the engine, which has been started automatically, the generated voltage is applied to the base of the transistor $20Tr_1$ through a filter comprised of a resistor and a capacitor. The turning ON of the transistor $20Tr_1$ causes the following transistor $20Tr_2$ to turn OFF, the transistor $10Tr_1$ to turn ON, and the output transistor $10Tr_2$ to turn OFF, thus releasing the starter electric current supply relay 10L to stop the starter 8. At the same time, the transmission gear changer 32 becomes ready for operation. Therefore, according to the driver's intention, the transmission gear can be shifted from the neutral to a ready-for-start state.

As a result, the control circuit 31 cuts off the supply of electric power to the engine ignition circuit in order to automatically stop the engine if the vehicle-to-vehicle distance detected by the vehicle-to-vehicle distance sensor 29 is less than the preset value or the lit color of the signal detected by the signal color identifying and detecting device 30 is yellow or red, the travel signal indicates the zero car speed, and no detection signal is received from the condition detecting means. If the vehicle-to-vehicle distance is the preset value or more, or the lit color of the signal has changed from red to green, then the control circuit supplies electric currents to the starter and the engine ignition circuit, thereby to automatically start the engine. Thus, the engine can be stopped only when the vehicle is stopped during a traffic jam and for waiting for the traffic lights to change; therefore, the lives of the mechanical components such as the starter motor for starting the engine can be extended and the automatic engine starting and stopping apparatus can be applied also to automatic vehicles, expanding the range of car models to which the apparatus can be applied.

At the time of the automatic stop, the buzzer 33 installed in the driver's seat cabin is driven by the control signal given by the control circuit 31 and it generates an alarm sound to notify the driver of danger. This makes it possible to securely prevent a traffic accident from occurring.

In the embodiment discussed above, the buzzer 33, which serves as an alarm device, is provided to notify the driver of the dangerous condition at the time of the automatic stop, however, the buzzer 33 may be omitted if the driver does not find it particularly necessary.

Embodiment 2

In Embodiment 1 described above, the signal color identifying and detecting device 30 is comprised of the video camera for photographing the signal. As an alternative, for example, as shown in FIG. 6B, a receiver 36, which receives the signal information transmitted from a ground station 37 provided along a roadway, may be mounted on the vehicle, and the lit color of the signal is determined from the received signal information by the signal color identifying and detecting device comprised of the signal color identifier, the determination signal being applied to a control circuit 31A.

Figure 3:
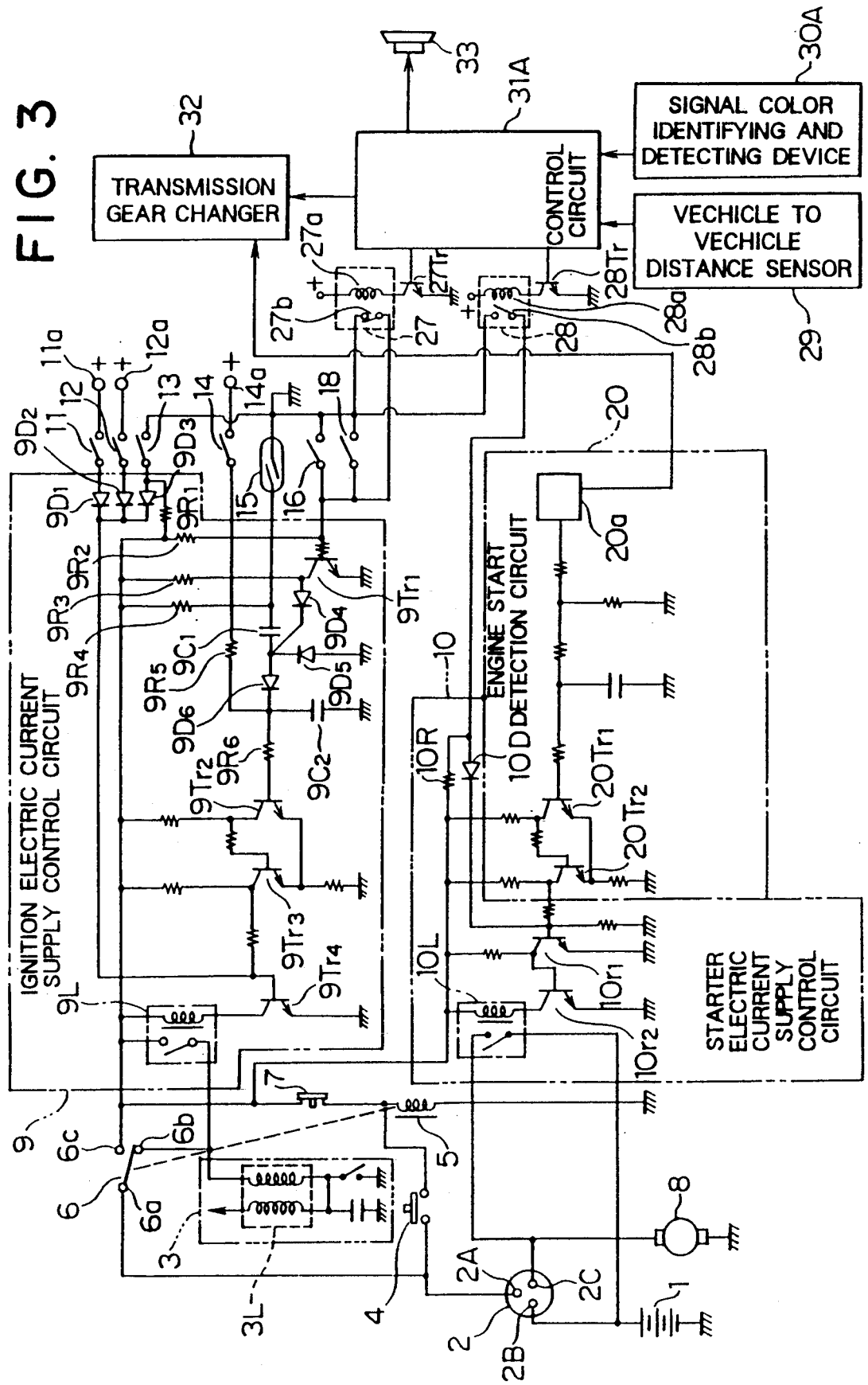
FIG. 3 is a circuit diagram for explaining Embodiment 3 of the present invention.

FIG. 3 is the circuit block diagram which shows Embodiment 3 of the present invention. In this circuit block diagram, all the components except the control circuit 31A and the signal color identifying and detecting device 30A are identical to those mentioned previously.

Only the characteristic parts of this embodiment will be explained. It is assumed that the vehicle-to-vehicle distance obtained through the vehicle-to-vehicle distance sensor 29 is less than the preset value or the determination signal obtained through the signal color identifying and detecting apparatus 30A shows yellow or red of the signal, with the vehicle stopped, the travel signal from the car speed sensor 15 indicates the zero car speed, and no detection signal is received from the condition detecting means. In this case, the control circuit 31A determines that the engine should be automatically stopped and it outputs the drive signal to the transistor 27Tr. Then it energizes the coil 27a of the automatic stop relay 27 to release the normally-close contact 27b. As a result, the output transistor 9Tr4 turns OFF and the ignition electric current supply relay 9L is released. Hence, the power to the engine ignition circuit 3 is cut off and the engine automatically stops.

On the other hand, at the time of the automatic start, when the control circuit 31A detects through the vehicle-to-vehicle distance sensor 29 that the distance from the preceding vehicle has reached the preset value or more or when it detects from the determination signal obtained through the signal color identifying and detecting device 30A that the lit color of the signal has changed from red to green, it outputs the drive signal to the transistor 28Tr. At this time, the control circuit de-energizes the coil 27a of the automatic stopping relay 27 to put the normally-close contact 27b back in the closed state. As a result, the output transistor 9Tr4 turns ON and the ignition electric current supply relay 9L is energized, supplying electric currents to the engine ignition circuit 3 as previously stated.

The coil 28a of the automatic starting relay 28 is energized, the normally-open contact 28b is closed, the transistor 10Tr1 turns OFF, and the transistor 10Tr2 turns ON, causing the exciting currents to flow into the starter electric current supply relay 10L to close the normally-close switch and supply electric currents to the starter 8, thus automatically starting the engine.

Embodiment 3

Figure 4:
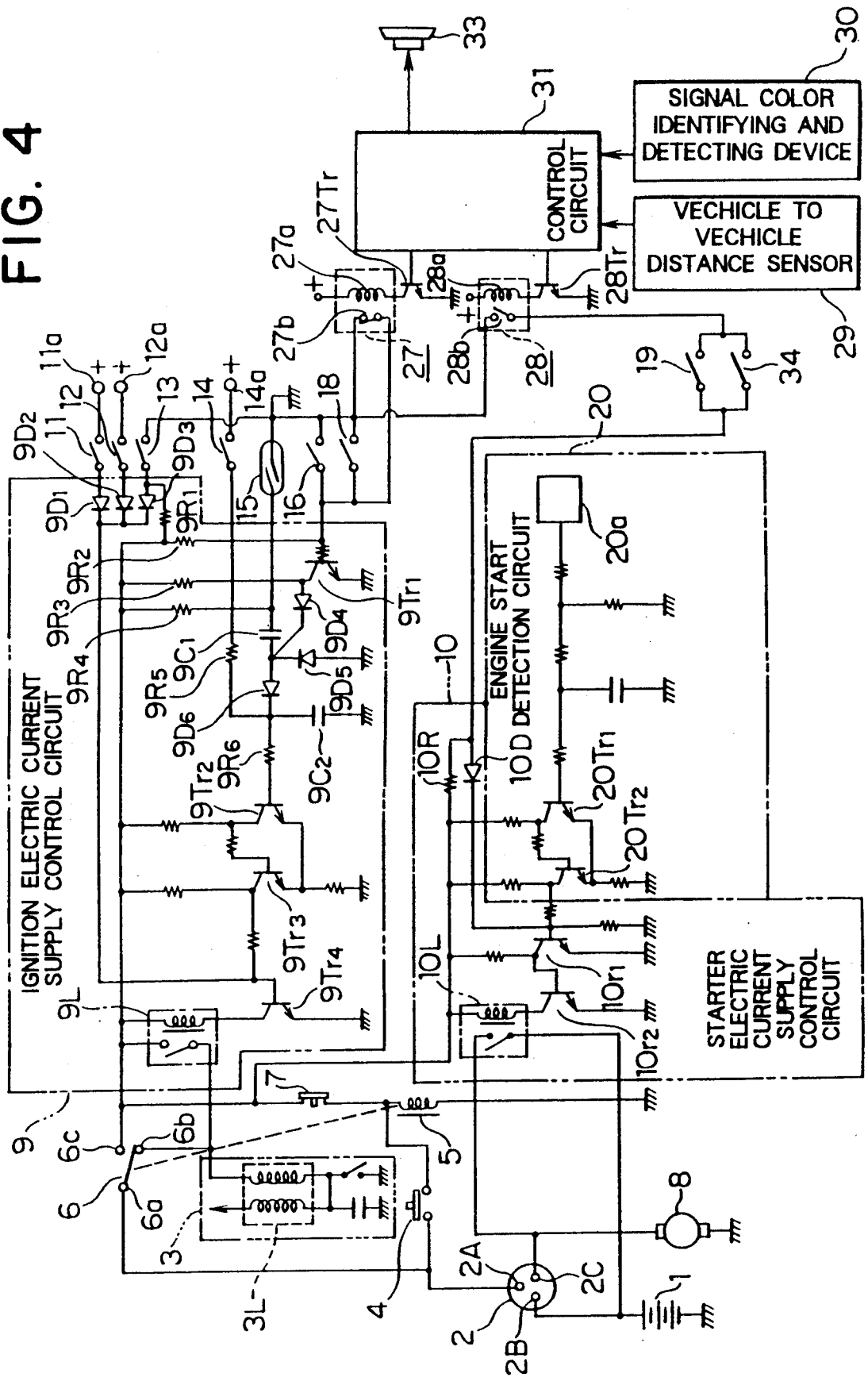
FIG. 4 is a circuit diagram for explaining Embodiment 4 of the present invention.

In Embodiment 1 and Embodiment 2, the transmission gear changer 32 is provided, which transmission gear changer is automatically shifted to the neutral by the control circuit 31 or the control circuit 31A at the time of the automatic engine stop for an automatic vehicle, however, this apparatus can be applied to a manual vehicle as well. FIG. 4 is the circuit diagram of the automatic engine starting and stopping apparatus according to this embodiment. In the drawing, the same reference numerals as those in FIG. 1 denote the identical or corresponding parts. In the drawing, a normally-open clutch switch 19 turns ON when the clutch pedal, which is not shown, is depressed to a maximum (to the position of 22b in FIG. 8), and a normally-open neutral switch 34 closes when the transmission, not shown, is set in the neutral position.

The clutch switch 19 and the neutral switch 34 are connected in parallel and they are connected between the normally-open contact 28b of the automatic starting relay 28 and the anode of the diode 10D incorporated in the starter electric current supply control circuit 10. In the case of this embodiment, the normally-open switch 19, which is interlocked with the clutch pedal 22, may be included as a part of the condition detecting means.

The operation of this embodiment will now be described with reference to the flowchart of FIG. 5.

It is assumed that the vehicle-to-vehicle distance obtained through the vehicle-to-vehicle distance sensor 29 is less than the preset value or the signal color obtained through the signal color identifying and detecting device 30 shows yellow or red, with the vehicle stopped, the travel signal from the car speed sensor 15 indicates the zero car speed, and no detection signal is received from the condition detecting means (the step ST1). In this case, a control circuit 31B determines that the engine should be automatically stopped and it outputs the drive signal to the buzzer 33 to issue the alarm to the driver (the step ST2). As a result, the control circuit 31B generates the drive signal and applies it to the base of the transistor 27Tr (the step ST3), and energizes the coil 27a of the automatic stopping relay 27 to open the normally-close contact 27b.

When the normally-close contact 27b is opened, with the accelerator switch 16 and the slope switch 18 open, the base of the transistor 9Tr1 is released from the grounded state. This causes the positive potential to be applied to the base of the transistor 9Tr1 via the resistor 9R2 to turn the transistor ON, and the collector thereof becomes the ground potential. As a result, the capacitor 9C2 is not charged with electric charges via the resistor 9R3 and diodes 9D4, 9D6, and further, it is not charged with electric charges via the resistor 9R5 if the turn signal switch 14 is open; therefore, the potential of the capacitor 9C2 becomes 0 V, causing the transistor 9Tr2 to turn OFF and the transistor 9Tr3 to turn ON.

Under this condition, if the lighting switch 11 and the reverse switch 12 are open and the positive potential applied to the terminals 11a, 12a is not applied to the base of the output transistor 9Tr4, and if the water temperature sensor 13 is closed and the base of the transistor 9Tr4 is grounded, then the output transistor 9Tr4 turns OFF and the ignition electric current supply relay 9L is released. Hence, the supply of electric power to the engine ignition circuit 3 is cut off and the engine stops automatically.

On the other hand, when the automatic stop is changed over to the automatic start, the control circuit 31B checks for the conditions for the automatic start, i.e., it determines whether the distance from the preceding vehicle has exceeded the preset value through the vehicle-to-vehicle distance sensor 29 or determines whether the lit color of the signal has changed from red to green through the signal color identifying and detecting device 30 (the step ST3). At this time, if the control circuit detects that the vehicle-to-vehicle distance is not the preset value or more, or the lit color of the signal has not changed from red to green, then it maintains the stop state and checks for the automatic start conditions, including the ON state of the clutch switch 19 or the neutral switch 34.

When the automatic start condition is detected in the step ST4, the application of the base drive signal given by the control circuit 31B is shifted from the base of the transistor 27Tr to the base of the transistor 28Tr. As a result, the transistor 27Tr turns OFF, putting the normally-close contact 27b back in the closed state. The turning ON of the transistor 28Tr energizes the coil 28a of the automatic starting relay 28, causing the normally-open contact 28b to be closed.

At this time, since the normally-close contact 27b of the automatic stopping relay 27 has been set back in the closed state, the base potential of the transistor 9Tr1 becomes 0 V and the transistor turns OFF. When the transistor 9Tr3 turns OFF consequently, the output transistor 9Tr4 turns ON, causing the exciting currents to flow into the ignition electric current supply relay 9L, and the normally-open switch is closed to supply electric currents to the engine ignition circuit 3.

Further, when the clutch pedal is depressed or the transmission is in the neutral position, the clutch switch 19 or the neutral switch 34 is closed to be connected in series to the normally-open contact 28B. Hence, the anode of the diode 10D is grounded via the normally-open contact 28b and the clutch switch 19 or the neutral switch 34. Accordingly, the currents flowing into the base of the transistor $10Tr_1$ via the resistor 10R and the diode 10D are bypassed to the ground via the normally-open contact 28b. The voltage reduced through the resistor 10R is applied to the base of the transistor $20Tr_2$, turning the transistor ON, turning the transistor $10Tr_1$ OFF, and further turning the transistor $10Tr_2$ ON, causing the exciting currents to flow into the starter electric current supply relay 10L to close the normally-open contact. This supplies electric currents to the starter 8 and the engine is started automatically.

When electric power is generated in the alternator 20a by the engine, which has been started automatically, the generated voltage is applied to the base of the transistor $20Tr_1$ through a filter comprised of a resistor and a capacitor. The turning ON of the transistor $20Tr_1$ causes the following transistor $20Tr_2$ to turn OFF, the transistor $10Tr_1$ to turn ON, and the output transistor $10Tr_2$ to turn OFF; this, in turn, causes the starter electric current supply relay 10L to be released and the starter 8 to stop. At the same time, the transmission gear becomes ready for operation. Therefore, according to the driver's intention, the transmission gear can be shifted from the neutral to the ready-for-start state.

What is claimed is:

1. An automatic starting and stopping apparatus for an engine, comprising:
   a starter for starting an engine,
   an engine ignition circuit for actuating said engine,
   a condition detecting means, which detects the operation maintaining condition of said engine,
   a car speed sensor, which generates a travel signal corresponding to the speed of the vehicle,
   a vehicle-to-vehicle distance sensor, which detects the distance between the vehicle and a preceding vehicle and determines whether said vehicle-to-vehicle distance is less than a preset value, and
   a controlling means, which carries out automatic stop and automatic start of said engine in accordance with the detection results of said condition detecting means, said car speed sensor, and said vehicle-to-vehicle distance sensor,
   said controlling means shutting off the electric power to said engine ignition circuit to automatically stop said engine if said vehicle-to-vehicle distance is less than the preset value, said travel signal indicates a zero car speed, and no detection signal is received from said condition detecting means, while supplying electric currents to said starter and said engine ignition circuit to automatically start said engine if said vehicle-to-vehicle distance is the preset value or more.

2. An automatic starting and stopping apparatus for an engine, comprising:
   a starter for starting the engine,
   an engine ignition circuit for actuating said engine,
   a condition detecting means, which detects the operation maintaining condition of said engine,
   a car speed sensor, which generates a travel signal corresponding to the speed of the vehicle,
   a signal color identifying and detecting device, which detects the lit color of a signal located in front of the vehicle and identifies whether it is yellow or red, and
   a controlling means, which carries out automatic stop and automatic start of said engine in accordance with the detection results of said condition detecting means, said car speed sensor, and said signal color identifying and detecting device,
   the controlling means shutting off the electric power to said engine ignition circuit to automatically stop said engine if the lit color of said signal is yellow or red, said travel signal indicates the zero car speed, and no detection signal is received from said condition detecting means, while supplying electric currents to said starter and said engine ignition circuit to automatically start said engine when the lit color of said signal has changed from red to green.

3. The automatic starting and stopping apparatus for an engine according to claim 2, wherein said signal color identifying and detecting device comprises a camera, which photographs a range nearly equivalent to the front view of a driver of the vehicle, and a signal color identifier, which identifies the lit color of said signal from an image photographed by said camera.

4. The automatic starting and stopping apparatus for an engine according to claim 2, wherein said signal color identifying and detecting device comprises a receiver, which receives signal information transmitted from a ground station, and a signal color identifier, which identifies the lit color of said signal from the received signal information.

5. An automatic starting and stopping apparatus for an engine, comprising:
   a starter for starting an engine,
   an engine ignition circuit for actuating said engine,
   a condition detecting means, which detects the operation maintaining condition of said engine,
   a car speed sensor, which generates a travel signal corresponding to the speed of the vehicle,
   a vehicle-to-vehicle distance sensor, which detects the distance between the vehicle and a preceding vehicle and determines whether said vehicle-to-vehicle distance is less than a preset value,
   a signal color identifying and detecting device, which detects the lit color of a signal located in front of said vehicle and identifies whether it is yellow or red, and
   a controlling means, which carries out automatic stop and automatic start of said engine in accordance with the detection results of said condition detecting means, said car speed sensor, said vehicle-to-vehicle distance sensor, and said signal color identifying and detecting device,
   said controlling means shutting off the electric power to said engine ignition circuit to automatically stop said engine if at least said vehicle-to-vehicle distance is less than the preset value or the lit color of said signal is yellow or red, and said travel signal indicates the zero car speed, and no detection signal is received from said condition detecting means, while supplying electric currents to said starter and said engine ignition circuit to automatically start said engine when said vehicle-to-vehicle distance is the preset value or more or when the lit color of said signal has changed from red to green.

6. The automatic starting and stopping apparatus for an engine according to claim 5, wherein said signal color identifying and detecting device comprises a camera, which photographs a range nearly equivalent to the front view of the driver of the vehicle, and a signal color identifier, which identifies the lit color of said signal from an image photographed by said camera.

7. The automatic starting and stopping apparatus for an engine according to claim 5, wherein said signal color identifying and detecting device comprises a receiver, which receives signal information transmitted from a ground station, and a signal color identifier, which identifies the lit color of said signal from the received signal information.

* * * * *